US008798856B2

(12) United States Patent
Major et al.

(10) Patent No.: US 8,798,856 B2
(45) Date of Patent: Aug. 5, 2014

(54) ACCESSORY LOAD CONTROL SYSTEMS AND METHODS

(75) Inventors: Gregory A. Major, Farmington Hills, MI (US); William R. Hill, Troy, MI (US); Todd M. Tumas, Taylor, MI (US); Kenneth L. Porrett, Grand Blanc, MI (US)

(73) Assignee: GM Global Technology Operations LLC

( * ) Notice: Subject to any disclaimer, the term of this patent is extended or adjusted under 35 U.S.C. 154(b) by 1137 days.

(21) Appl. No.: 12/758,452

(22) Filed: Apr. 12, 2010

(65) Prior Publication Data
US 2011/0251756 A1    Oct. 13, 2011

(51) Int. Cl.
  *G06F 7/00*      (2006.01)
  *B60W 10/06*   (2006.01)
(52) U.S. Cl.
  CPC ..................................... *B60W 10/06* (2013.01)
  USPC ............................................................ 701/36
(58) Field of Classification Search
  CPC ...................................................... B60W 10/06
  USPC ............................. 701/36, 54, 84, 87, 99–101
  See application file for complete search history.

(56) References Cited

U.S. PATENT DOCUMENTS

| 4,642,770 A * | 2/1987 | Shirley ........................... 701/36 |
| 4,748,951 A * | 6/1988 | Manaka et al. .......... 123/339.16 |
| 2001/0042362 A1* | 11/2001 | Scarlett et al. ............. 56/10.2 G |
| 2003/0116130 A1* | 6/2003 | Kisaka et al. ............. 123/406.45 |
| 2007/0095308 A1* | 5/2007 | Glugla et al. ............... 123/48 R |
| 2010/0030447 A1* | 2/2010 | Smyth et al. ................... 701/102 |
| 2010/0042279 A1* | 2/2010 | Thompson et al. ............. 701/22 |
| 2010/0070146 A1* | 3/2010 | Ishii et al. ....................... 701/50 |

FOREIGN PATENT DOCUMENTS

| CN | 101558243 | 10/2009 |
| CN | 101638095 | 2/2010 |
| JP | 08-105336 | 4/1996 |

* cited by examiner

*Primary Examiner* — Khoi Tran
*Assistant Examiner* — Harry Oh

(57) ABSTRACT

An accessory load control system for a vehicle, includes an actuator control module, a period estimation module, and a load control module. The actuator control module operates an internal combustion engine of the vehicle in a high-efficiency (HE) mode. The period estimation module estimates a period between a current time and a future time when an actual load on a crankshaft of the engine will reach a maximum engine load associated with the HE mode. The load control module selectively decreases engine loads applied by vehicle accessories, respectively, based on the period.

20 Claims, 5 Drawing Sheets

| Device | Discrete Large Load Shed | | | Discrete Small Load Shed | Variable Large Load Shed | Variable Small Load Shed |
|---|---|---|---|---|---|---|
| | Load Shed Watts | Priority # | Load Shed Active? Y/A | Load Shed Event Duration Period | | |
| A/C Compressor | | | | ... | | |
| Accessory B | ... | ... | ... | | | |
| Accessory C | | | | | | |
| ... | | | | | | |
| Device N | | | | | | |
| Compounded Accessories (E.g., A/C compressor, Clutch Front end Fan) | Load Shed | Priority | Load Shed Active? | Load Shed Event Duration | | |
| ... | ... | ... | ... | ... | | |
| Maximum Load Shed (Sum of all Y's) | Sum | | | ... | | |

ACCESSORY LOAD CONTROL SYSTEMS AND METHODS

FIELD

The present disclosure relates to internal combustion engines and more particularly to engine load control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, injection of the fuel or spark provided by a spark plug.

An engine control module (ECM) controls the torque output of the engine. Under some circumstances, the ECM may operate the engine in one or more modes that increase efficiency (i.e., reduce fuel consumption). For example only, the ECM may disable one or more cylinders of the engine and/or operate non-disabled cylinders of the engine in a homogenous charge compression ignition (HCCI) mode.

SUMMARY

An accessory load control system for a vehicle, includes an actuator control module, a period estimation module, and a load control module. The actuator control module operates an internal combustion engine of the vehicle in a high-efficiency (HE) mode. The period estimation module estimates a period between a current time and a future time when an actual load on a crankshaft of the engine will reach a maximum engine load associated with the HE mode. The load control module selectively decreases engine loads applied by vehicle accessories, respectively, based on the period.

An accessory load control method for a vehicle, includes: operating an internal combustion engine of the vehicle in a high-efficiency (HE) mode; estimating a period between a current time and a future time when an actual load on a crankshaft of the engine will reach a maximum engine load associated with the HE mode; and selectively decreasing engine loads applied by vehicle accessories, respectively, based on the period.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is an exemplary engine load table according to the principles of the present disclosure;

DETAILED DESCRIPTION

Figure 1:
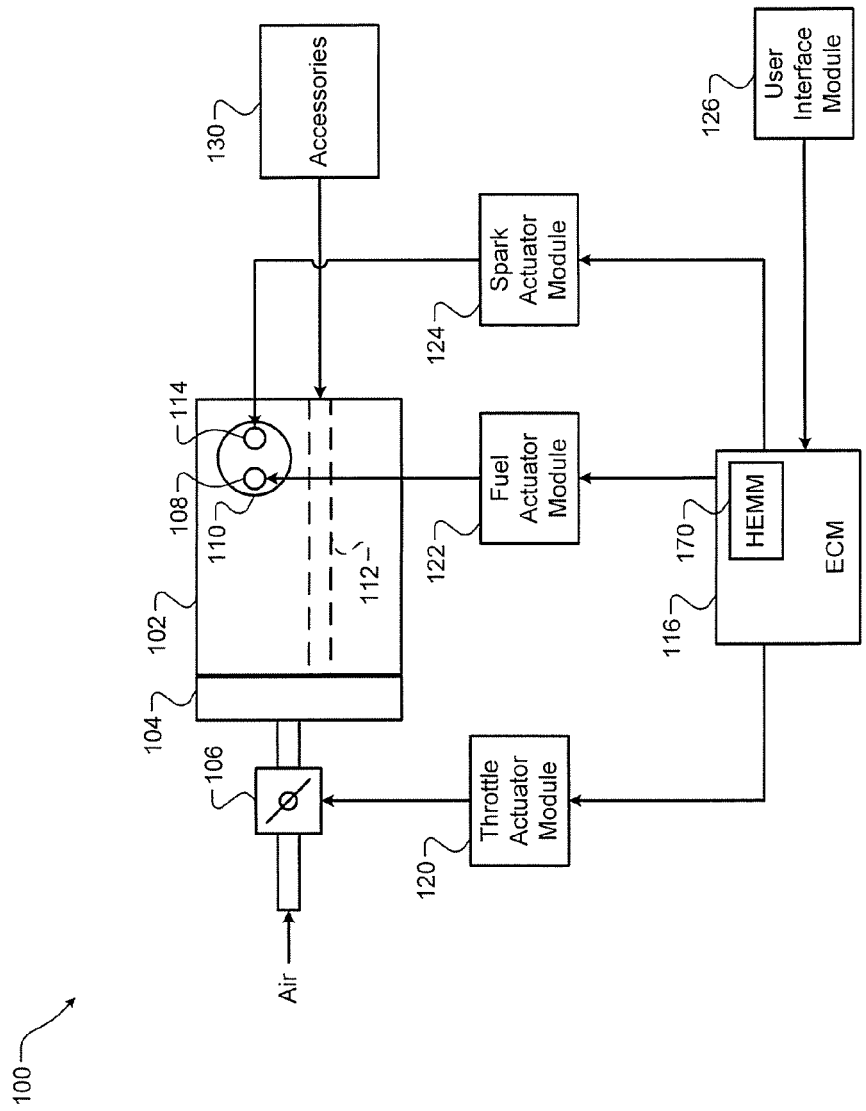
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary engine system 100 is presented. An engine 102 generates drive torque for a vehicle. One or more electric motors (or motor-generators) may additionally or alternatively generate drive torque. While the engine 102 is shown and will be discussed as a spark-combustion internal combustion engine (ICE), the engine 102 may include another suitable type of engine, such as a compression combustion type engine, an electric type engine, or a hybrid type engine.

Air is drawn into the engine 102 through an intake manifold 104. Airflow into the engine 102 may be varied using a throttle valve 106. One or more fuel injectors, such as fuel injector 108, mix fuel with the air to form a combustible air/fuel mixture. The air/fuel mixture is combusted within cylinders of the engine 102, such as cylinder 110. Although the engine 102 is depicted as including one cylinder, the engine 102 may include more than one cylinder.

The cylinder 110 includes a piston (not shown) that is mechanically linked to a crankshaft 112. One combustion event within the cylinder 110 may be described in four phases: an intake phase, a compression phase, a combustion (or expansion) phase, and an exhaust phase. During the intake phase, the piston moves toward a bottommost position and draws air into the cylinder 110. During the compression phase, the piston moves toward a topmost position and compresses the air or air/fuel mixture within the cylinder 110.

During the combustion phase, spark from a spark plug 114 ignites the air/fuel mixture. The combustion of the air/fuel mixture drives the piston back toward the bottommost position, and the piston rotatably drives the crankshaft 112. Resulting exhaust gas is expelled from the cylinder 110 to complete the exhaust phase and the combustion event. The engine 102 outputs torque to a transmission (not shown) via the crankshaft 112.

An engine control module (ECM) 116 controls the torque output of the engine 102. The ECM 116 controls opening of the throttle valve 106 via a throttle actuator module 120. The ECM 116 controls the provision of fuel to the engine 102 via a fuel actuator module 122. The ECM 116 controls the provision of spark to the engine 102 via a spark actuator module 124.

The ECM 116 may selectively operate the engine 102 in one or more high efficiency (HE) modes. Operating the engine 102 in a HE mode enables a decrease in fuel consumption relative to normal engine operation. For example only, the ECM 116 may disable (combustion within) one or more cylinders of the engine 102 under some circumstances. The ECM 116 may be operating in what may be referred to as a displacement on demand (DOD) mode, an active fuel management (AFM) mode, a fuel cutoff (FCO) mode, or another suitably named mode when one or more cylinders are disabled.

The number of cylinders that the ECM 116 may disable may be variable. Each different number of cylinders that are disabled may be considered a different HE mode. For example only, operating the engine 102 with one number of cylinders disabled may be considered one HE mode, operating the engine 102 with another number cylinders disabled may be considered another HE mode.

Another exemplary HE mode may include operating the engine 102 in a homogenous charge compression ignition (HCCI) mode where the ECM 116 disables the provision of spark to the engine 102. In the HCCI mode, increased temperature and pressure (therefore density) associated with compression ignites the air/fuel mixture within the cylinders of the engine 102. Operating in the HCCI mode enables a fuel consumption decrease relative to spark-based ignition.

One or more of the HE modes may be active concurrently. For example only, the ECM 116 may disable one or more of the cylinders of the engine 102 and operate the non-disabled cylinders of the engine 102 in the HCCI mode.

A user interface module 126 may be implemented within a passenger cabin (not shown) of the vehicle. A user may select one of a predetermined number of options regarding the extent to which the HE modes should be used via the user interface module 126. For example only, the user may select from a maximum HE mode, a medium HE mode, a low HE mode, and an HE OFF mode. The ECM 116 may disable use of the HE modes when the user selects the HE OFF mode.

A vehicle may include one or more accessories that impose a load (i.e., a negative torque) on the crankshaft 112 (i.e., an engine load). More specifically, the vehicle may include one or more accessories that reduce the torque output of the engine 102 when active. A given accessory may impose, for example, a mechanical load, an electrical load, or another suitable type of load on the engine 102. Electrical loads may affect the torque output of the engine 102 to a greater extent in electric and hybrid-electric vehicles.

Exemplary accessories that impose a load on the engine 102 when active may include, but are not limited to, exterior lights (e.g., headlights), interior lights, heaters (e.g., for a seat, engine coolant, a battery, etc.), cooled seats, a rear-window defogger, an air conditioning (A/C) system, battery chargers, and engine cooling fans. Other exemplary accessories that may impose a load on the engine 102 when active may include, but are not limited to, a battery cooling blower, a power steering system, a fuel pump, a chassis pump, a coolant pump, a motor of the throttle actuator module 120, a transmission oil pump, a torque converter, an engine oil pump, direct current (DC) to DC converters, and other suitable loads. The accessories of a given vehicle that impose a load on the vehicle's engine are collectively illustrated by accessories 130. A given one of the accessories 130 may impose a fixed (i.e., discrete) engine load or a variable engine load. Other things may also impose a load on the engine 102, such as aerodynamic drag, road grade, and coefficient of friction of the road.

The ECM 116 determines an actual engine load based on a sum of the loads imposed on the engine 102. The ECM 116 may selectively exit a current HE mode when a difference between the actual engine load and a maximum engine load associated with the current HE mode is less than a predetermined value. In other words, the actual engine load may cause the ECM 116 to exit a currently active HE mode under some circumstances, such as when the actual engine load approaches the maximum engine load.

However, the load imposed by one or more of the accessories 130 may be shedable. For example only, a rear-window defogger may be disabled to shed the engine load associated with the rear-window defogger. Shedding the engine load associated with the rear-window defogger and/or one or more other accessories may allow continued operation in the current HE mode.

In contrast with engine loads that may be shed, engine loads associated with others of the accessories 130 may be deemed non-shedable. For example only, engine loads associated with the exterior lights and a power steering system may be non-shedable. Also, engine loads associated with aerodynamic drag, the road grade, and the coefficient of friction of the road may be non-shedable.

The ECM 116 includes a HE mode module (HEMM) 170. The HEMM 170 determines the actual engine load based on a sum of the engine loads. The HEMM 170 determines a maximum engine load based on the current HE mode. The maximum engine load may correspond to an actual engine load above which the current HE mode should be exited.

The HEMM 170 estimates a period between a current time and a future time when the actual engine load will reach the maximum engine load. The HEMM 170 selectively disables one or more of the accessories 130 to shed the engine load associated with those accessories. In this manner, the HEMM 170 reduces the actual engine load and allows the ECM 116 to remain in the current HE mode.

Figure 2:
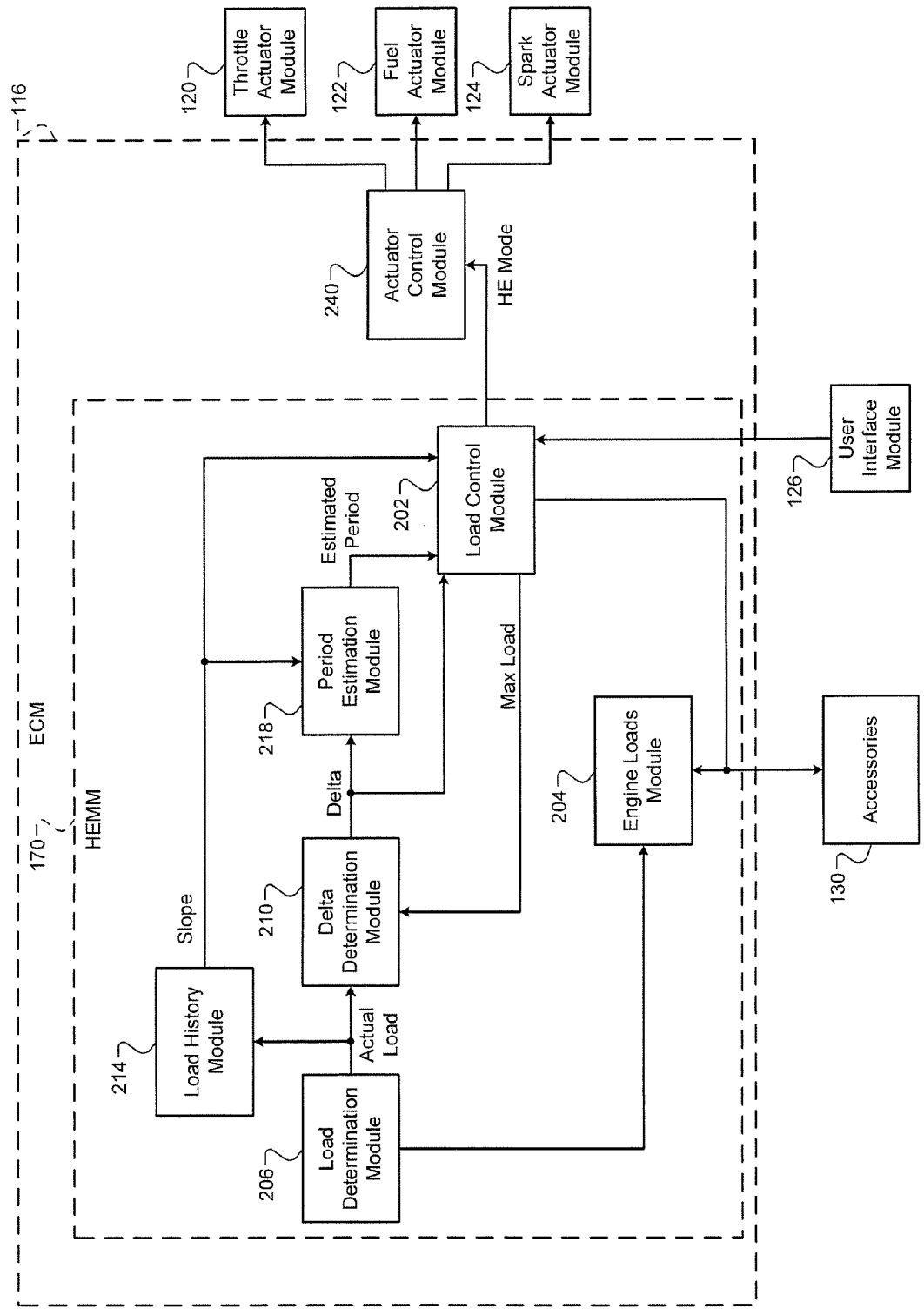
FIG. 2 is a functional block diagram of an exemplary high efficiency mode module (HEMM) according to the principles of the present disclosure.

Referring now to FIG. 2, a functional block diagram of an exemplary implementation of the HEMM 170 is presented. The HEMM 170 may include a load control module 202, an engine loads module 204, a load determination module 206, a delta determination module 210, a slope determination module 214, and a period estimation module 218.

The load control module 202 controls whether ones of the accessories 130 are active or disabled. More specifically, the load control module 202 selectively activates and disables accessories that impose engine loads when active. For ones of the accessories 130 that impose variable loads, the load control module 202 may control the load imposed by those accessories.

The load control module 202 determines which HE mode should be active and provides an HE mode signal to an actuator control module 240. The HE mode signal indicates the current HE mode. The determination of the current HE mode and the determination of which ones of the engine loads should be shed is discussed further below.

The load control module 202 may populate an engine load table in the engine loads module 204. An exemplary illustration of the engine load table is depicted in FIG. 3. The engine load table may indicate which ones of the accessories 130 are active, the engine loads imposed by the active accessories, whether the engine loads associated with the active accessories are shedable, priority values for shedding or not shedding the engine loads associated with the active accessories, whether the engine loads associated with the active accessories are currently being shed, and how long the engine loads associated with the active accessories have been shed, respectively. The load control module 202 populate the engine load table based on whether a given active accessory has a variable load or a fixed load, whether the shedable load is large (relatively) or small, and whether ones of the accessories 130 impose compounded engine loads.

A given one of the accessories 130 may impose a compounded engine load when, for example, the given accessory includes more than one component that imposes an independent engine load when active. For example only, the A/C system may include a compressor, a clutch, a fan, and other components that each impose an independent engine load.

The load determination module 206 determines the actual engine load based on the engine loads. More specifically, the load determination module 206 may determine the actual engine load as a sum of the engine loads associated with the active accessories and the other engine loads. The load determination module 206 provides the actual engine load to the delta determination module 210 and to the slope determination module 214.

The delta determination module 210 determines a delta value based on the actual engine load and the maximum engine load. The delta determination module 210 may determine the delta value based on a difference between the actual engine load and the maximum engine load.

The load control module 202 may determine the maximum engine load based on the current HE mode and provide the maximum engine load to the delta determination module 210. For example only, the load control module 202 may determine the maximum engine load from a mapping or a function that relates the current HE mode to the maximum engine load for the current HE mode.

The slope determination module 214 determines a slope of the actual engine load. The slope determination module 214 determines the slope based on the actual engine load and one or more previous actual engine loads. The slope determination module 214 provides the slope to the period estimation module 218. The period estimation module 218 estimates a period between a current time and a future time when the actual engine load will reach the maximum engine load based on the slope and the delta value. For example only, the period estimation module 218 may estimate the period based on a quotient of the delta value over the slope.

The load control module 202 may selectively shed one or more engine loads associated with the active accessories based on the estimated period. The load control module 202 may also selectively shed one or more engine loads associated with the active accessories based on other parameters, such as the delta value, the slope, and other suitable parameters.

The load control module 202 may maintain the active accessories in the active state when the estimated period is greater than a predetermined period. In this manner, when the actual engine load will reach the maximum engine load in more than the predetermined period from the current time, the load control module 202 may leave the active accessories unchanged.

When the estimated period is within a predetermined range and when the delta value is greater than a predetermined value, the load control module 202 may selectively shed the engine loads associated with one or more of the active accessories. An upper limit of the predetermined range may be less than or equal to the predetermined period. A lower limit of the predetermined range is less than the upper limit.

For example only, the load control module 202 may look first to the small engine loads associated with the active accessories when the estimated period is within of the predetermined range and when the delta value is greater than the predetermined value. The load control module 202 may shed one or more or all of the small engine loads when a first sum of the small engine loads is less than the delta value.

When the first sum of the small engine loads is greater than the delta value, the load control module 202 may look to the large engine loads. The load control module 202 may shed one or more or all of the large engine loads when a second sum of the large engine loads is less than the delta value. If the second sum of the large engine loads is greater than the delta value, the load control module 202 may exit the current HE mode and activate a next, less fuel efficient mode.

For example only, when the current HE mode involves operating with a number of the cylinders of the engine 102 disabled (e.g., 4), the next mode may involve having a lesser number of cylinders disabled (e.g., 3, 2, 1, or 0). When the current HE mode involves utilizing the HCCI mode, the next HE mode may include spark-based ignition. The actuator control module 240 selectively adjusts operation of the engine 102 (e.g., the throttle actuator module 120, the fuel actuator module 122, the spark actuator module 124, and/or other engine actuators) when the current HE mode is exited and the next mode is activated.

When the slope of the actual engine load is negative, the load control module 202 may activate engine loads that are currently being shed. In other words, the load control module 202 may activate one or more or all of the engine loads that are currently being shed when the slope of the actual engine load is negative.

Figure 4:
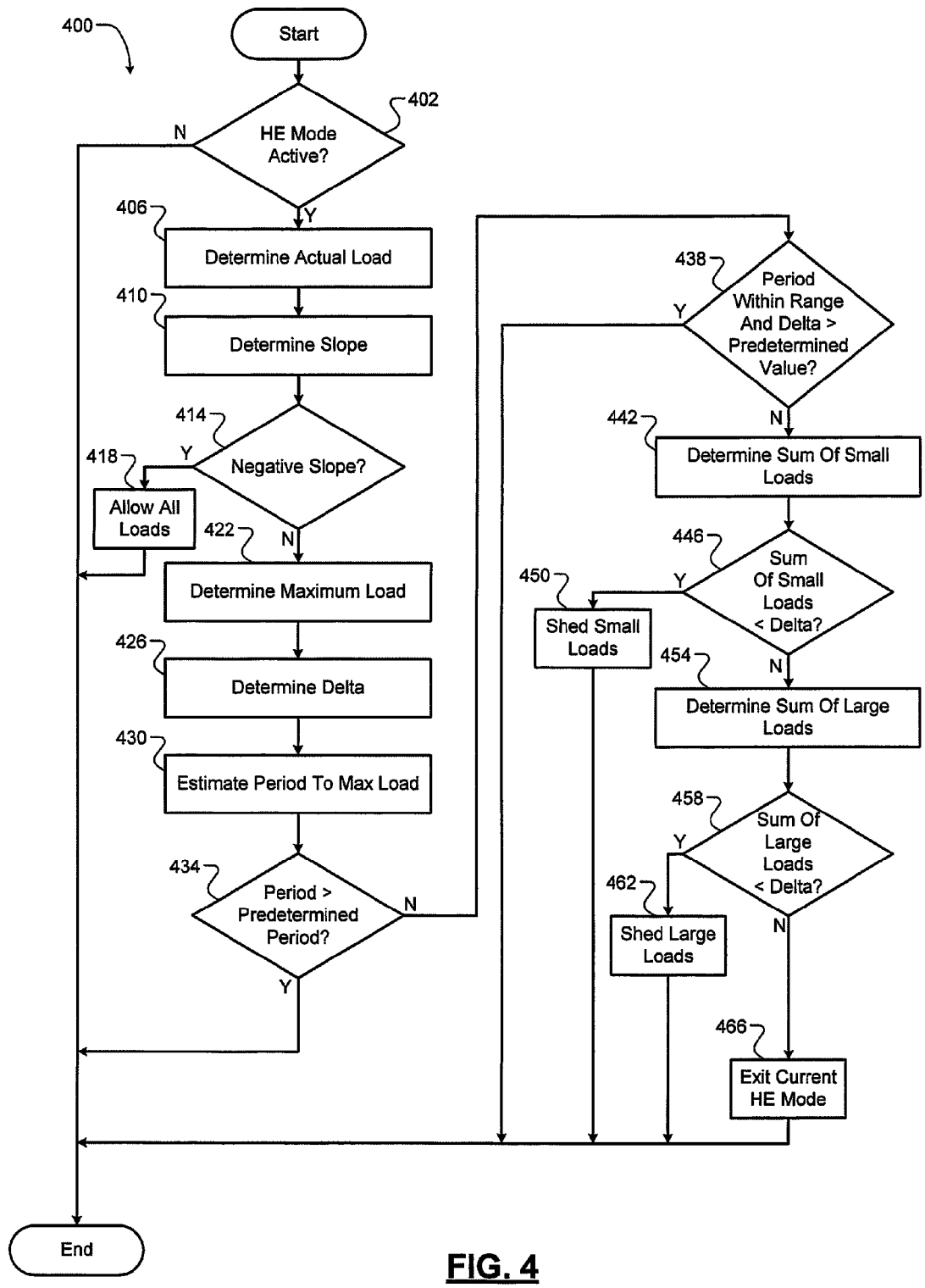
FIG. 4 is a flowchart depicting an exemplary method of shedding engine loads to maximize time spent in a current high efficiency (HE) mode according to the principles of the present disclosure.

Referring now to FIG. 4, a flowchart depicting an exemplary method 400 of shedding one or more engine loads to maximize time spent in a current HE mode is presented. Control may begin with 402 where control determines whether a HE mode is active. If true, control continues to 406; if false, control may end.

At 406, control determines the actual engine load. Control may determine the actual engine load based on a sum of the loads associated with the active accessories and the other engine loads. Control determines the slope of the actual engine load at 410. Control determines the slope based on the actual engine load and one or more previous actual engine loads.

Control determines whether the slope is negative at 414. If true, control may continue with 418; if false, control may continue with 422. At 418, control may allow all engine loads and end. In other words, control may enable engine loads that are currently shed at 418. At 422, control determines the maximum engine load for the current HE mode.

Control determines the delta value based on the actual engine load and the maximum engine load at 426. More specifically, control may set the delta value equal to the difference between the actual engine load and the maximum engine load at 426. At 430, control estimates the period between the current time and the future time when the actual engine load will reach the maximum engine load. Control may estimate the period based on the delta value and the slope.

At 434, control determines whether the estimated period is greater than the predetermined period. If true, control may end; if false, control may continue with 438. Control may determine whether the estimated period is within the predetermined range and whether the delta value is greater than the predetermined value at 438. If both are true, control may end; if either is false, control may continue with 442.

Control may determine the sum of the small engine loads associated with the active accessories at 442. Control may determine whether the sum of the small engine loads is less than the delta value at 446. If true, control may shed one or more or all of the small engine loads at 450 and control may end; if false, control may continue with 454.

At 454, control may determine a sum of the large engine loads associated with the active accessories. At 458, control may determine whether the sum of the large engine loads is less than the delta value. If true, control may shed one or more or all of the large engine loads at 462 and control may end; if false, control exits the current HE mode and activates the next mode at 466. The next mode may include a next, less efficient HE mode or another suitable mode. Control may then end. While control is discussed and shown as ending, the method 400 may be performed continuously, and control may instead return to start.

Figure 5:
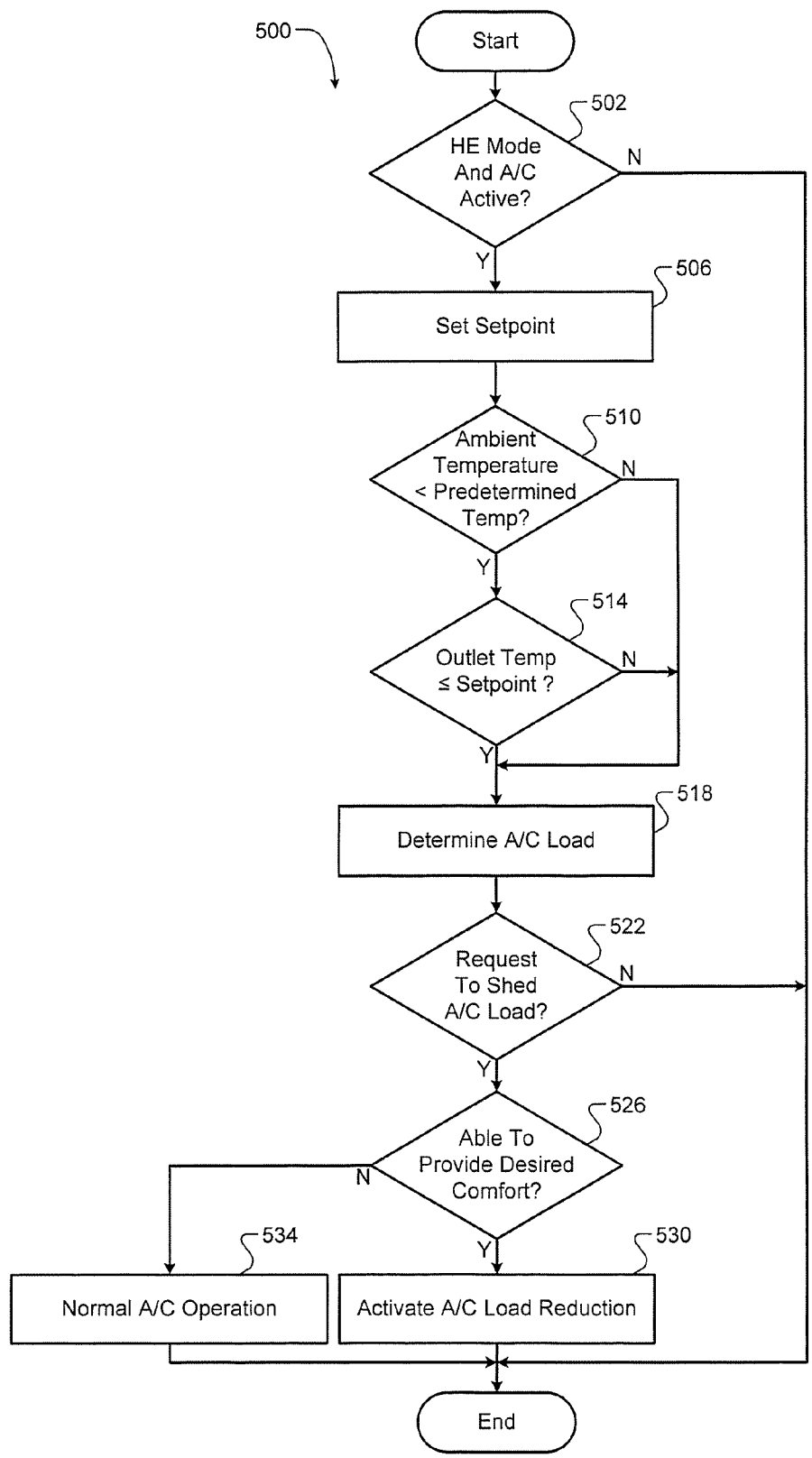
FIG. 5 is a flowchart depicting an exemplary method of selectively shedding engine load associated with an air conditioning (A/C) system to maximize time spent in a current HE mode according to the principles of the present disclosure.

Referring now to FIG. 5, a flowchart depicting an exemplary method 500 of selectively shedding the engine load imposed when an air conditioning (A/C) system is active to maximize time spent in a current HE mode is presented. Control may begin with 502 where control determines whether a HE mode is active and whether the A/C system is active. If true, control may continue with 506; if false, control may end.

At 506, control may set one or more setpoints for the NC system. For example only, control may set a setpoint for an outlet temperature of the A/C system and one or more desired comfort setpoints at 506. The outlet temperature may refer to a temperature of air that is output by the A/C system and that is provided to the passenger cabin of the vehicle.

Control may determine whether an ambient air temperature is less than a predetermined temperature at 510. If true, control may continue with 514; if false, control may continue with 518. If false, control may instead end in various implementations. Control may determine whether the outlet temperature is less than or equal to the setpoint temperature at 514. If true, control may continue with 518; if false, control may continue with 518. If false, control may instead end in various implementations.

At this point, the A/C system may be in what may be referred to as a post-pull down state. The post-pull down state may refer to when, after the A/C system is activated by a user, the A/C system has achieved desired cooling within the passenger cabin. When in the post-pull down state, one or more of the engine loads imposed by the A/C system may be selectively shed.

At 518, control determines the engine load associated with the A/C system. As the A/C system includes more than one component that imposes an independent engine load, the engine load associated with the A/C system may be referred to as a compounded load. For example only, an A/C compressor may impose a first engine load, an A/C compressor clutch may impose a second engine load, an A/C blower may impose a third engine load, and a fan may impose a fourth engine load. The A/C system may also include other components that impose independent engine loads. Control may determine the engine load associated with the A/C system based on a sum of the independent engine loads.

Control determines whether a request to shed one or more of the engine loads imposed by the NC system has been received at 522. If true, control may continue with 526; if false, control may end. Control may determine whether the A/C system will be able to provide desired comfort settings if an A/C load reduction strategy is used at 526. If true, control may continue with 530; if false, control may pursue normal operation of the NC system at 534 and control may end.

At 530, control may activate a strategy to reduce the engine load associated with the A/C system. For example only, control may reduce the operation of the NC compressor, extend a cycling time of the NC system, reduce power delivered to the fan, reduce power delivered to the A/C bower, and/or increase passenger cabin air recirculation. Control may then end. While control is discussed and shown as ending, the method 500 may be performed continuously, and control may instead return to start.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An accessory load control system for a vehicle, comprising:
    an actuator control module that operates an internal combustion engine of the vehicle in a high-efficiency (HE) mode;
    a period estimation module that estimates a period between a current time and a future time when an actual load on a crankshaft of the engine will reach a maximum engine load associated with the HE mode; and
    a load control module that selectively decreases engine loads applied by vehicle accessories, respectively, based on the period.

2. The accessory load control system of claim 1 wherein the HE mode includes at least one of a homogenous charge compression ignition (HCCI) mode and disabling combustion within at least one cylinder of the engine.

3. The accessory load control system of claim 1 further comprising:
    a slope determination module that determines a slope of the actual load; and
    a delta determination module that determines a delta value based on a difference between the actual load and the maximum engine load,
    wherein the period estimation module estimates the period based on the slope and the delta value.

4. The accessory load control system of claim 3 wherein the period estimation module sets the period equal to a quotient of the delta value over the slope.

5. The accessory load control system of claim 3 wherein the slope determination module determines the slope based on the actual load and at least one previous actual load.

6. The accessory load control system of claim 3 wherein the load control module increases at least one of the loads applied by one or more of the vehicle accessories that are currently decreased when the slope is negative.

7. The accessory load control system of claim 1 wherein the vehicle accessories include a first subset of vehicle accessories and a second subset of vehicle accessories, wherein the loads applied by the vehicle accessories of the first subset are less than the loads applied by the vehicle accessories of the second subset, and wherein the load control module determines a first sum of the loads applied by the vehicle accessories of the first subset and selectively disables at least one of the vehicle accessories of the first subset when the first sum is less than a difference between the actual load and the maximum engine load.

8. The accessory load control system of claim 7 wherein the load control module determines a second sum of the loads applied by the vehicle accessories of the second subset and selectively disables at least one of the vehicle accessories of the second subset when the second sum is less than the difference and the first sum is one of greater than and equal to the difference.

9. The accessory load control system of claim 8 wherein the load control module sets a mode to a next mode when the second sum is one of greater than and equal to the difference, wherein the actuator control module operates the engine in the next mode, and wherein a first fuel consumption associated with the next mode is greater than a second fuel consumption associated with the HE mode.

10. The accessory load control system of claim 1 wherein the load control module maintains the operation of the engine in the HE mode.

11. An accessory load control method for a vehicle, comprising:

operating an internal combustion engine of the vehicle in a high-efficiency (HE) mode;

estimating a period between a current time and a future time when an actual load on a crankshaft of the engine will reach a maximum engine load associated with the HE mode; and selectively decreasing engine loads applied by vehicle accessories, respectively, based on the period.

12. The accessory load control method of claim 11 wherein the HE mode includes at least one of a homogenous charge compression ignition (HCCI) mode and disabling combustion within at least one cylinder of the engine.

13. The accessory load control method of claim 11 further comprising:

determining a slope of the actual load; and determining a delta value based on a difference between the actual load and the maximum engine load; and estimating the period based on the slope and the delta value.

14. The accessory load control method of claim 13 further comprising setting the period equal to a quotient of the delta value over the slope.

15. The accessory load control method of claim 13 further comprising determining the slope based on the actual load and at least one previous actual load.

16. The accessory load control method of claim 13 further comprising increasing at least one of the loads applied by one or more of the vehicle accessories that are currently decreased when the slope is negative.

17. The accessory load control method of claim 11 further comprising:

determining a first sum of the loads applied by a first subset of the vehicle accessories; and selectively disabling at least one of the vehicle accessories of the first subset when the first sum is less than a difference between the actual load and the maximum engine load, wherein the vehicle accessories include the first subset and a second subset of vehicle accessories, and wherein the loads applied by the vehicle accessories of the first subset are less than the loads applied by the vehicle accessories of the second subset.

18. The accessory load control method of claim 17 further comprising:

determining a second sum of the loads applied by the vehicle accessories of the second subset; and selectively disabling at least one of the vehicle accessories of the second subset when the second sum is less than the difference and the first sum is one of greater than and equal to the difference.

19. The accessory load control method of claim 18 further comprising:

setting a mode to a next mode when the second sum is one of greater than and equal to the difference; and operating the engine in the next mode, wherein a first fuel consumption associated with the next mode is greater than a second fuel consumption associated with the HE mode.

20. The accessory load control method of claim 11 further comprising maintaining the operation of the engine in the HE mode.

* * * * *